United States Patent
Czaplicki et al.

(10) Patent No.: US 12,202,933 B2
(45) Date of Patent: Jan. 21, 2025

(54) HIGH ELASTIC MODULUS STRUCTURAL FOAM MATERIALS WITH IMPROVED STRAIN TO FAILURE

(71) Applicant: Zephyros, Inc., Romeo, MI (US)

(72) Inventors: Michael Czaplicki, Romeo, MI (US); Keith Madaus, Romeo, MI (US); David Kosal, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 454 days.

(21) Appl. No.: 17/263,741

(22) PCT Filed: Aug. 6, 2019

(86) PCT No.: PCT/US2019/045285
§ 371 (c)(1),
(2) Date: Jan. 27, 2021

(87) PCT Pub. No.: WO2020/033393
PCT Pub. Date: Feb. 13, 2020

(65) Prior Publication Data
US 2021/0301072 A1   Sep. 30, 2021

Related U.S. Application Data

(60) Provisional application No. 62/714,842, filed on Aug. 6, 2018.

(51) Int. Cl.
| | |
|---|---|
| *C08G 59/42* | (2006.01) |
| *B82Y 30/00* | (2011.01) |
| *C08K 3/013* | (2018.01) |
| *C08L 63/00* | (2006.01) |

(52) U.S. Cl.
CPC .......... *C08G 59/4253* (2013.01); *C08K 3/013* (2018.01); *C08L 63/00* (2013.01); *B82Y 30/00* (2013.01); *C08K 2201/011* (2013.01); *C08L 2203/14* (2013.01); *C08L 2205/03* (2013.01); *C08L 2207/53* (2013.01)

(58) Field of Classification Search
CPC ................ C08G 59/4253; C08K 3/013; C08K 2201/011; C08L 63/00; C08L 2203/14; C08L 2205/03; C08L 2207/53; B82Y 30/00
USPC ........................................................ 523/201
See application file for complete search history.

(56) References Cited

U.S. PATENT DOCUMENTS

| | | |
|---|---|---|
| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |
| 4,096,202 A | 6/1978 | Farnham et al. |
| 4,304,709 A | 12/1981 | Salee |
| 4,306,040 A | 12/1981 | Baer |
| 4,495,324 A | 1/1985 | Chacki et al. |
| 4,536,436 A | 8/1985 | Maeoka et al. |
| 5,275,853 A | 1/1994 | Silvis et al. |
| 5,464,924 A | 11/1995 | Silvis et al. |
| 5,962,093 A | 10/1999 | White et al. |
| 6,263,635 B1 | 7/2001 | Czaplicki |
| 6,296,298 B1 | 10/2001 | Barz |
| 6,311,452 B1 | 11/2001 | Barz et al. |
| 6,358,584 B1 | 3/2002 | Czaplicki |
| 6,419,305 B1 | 7/2002 | Larsen |
| 6,467,834 B1 | 10/2002 | Barz et al. |
| 6,474,723 B2 | 11/2002 | Czaplicki et al. |
| 8,475,694 B2 | 7/2013 | Kassa et al. |
| 8,771,564 B2 | 7/2014 | Kassa et al. |
| 9,157,013 B2 | 10/2015 | Czaplicki |
| 9,382,460 B2 | 7/2016 | Czaplicki |
| 9,394,468 B2 | 7/2016 | Czaplicki et al. |
| 10,577,522 B2 | 3/2020 | Awkal et al. |
| 10,577,523 B2 | 3/2020 | Miller et al. |
| 11,248,145 B2 | 2/2022 | Czaplicki |
| 11,667,813 B2 | 6/2023 | Czaplicki |
| 2006/0276601 A1 | 12/2006 | Lutz et al. |
| 2011/0213070 A1 | 9/2011 | Okuno et al. |
| 2014/0113983 A1 | 4/2014 | Czaplicki |
| 2017/0121451 A1 | 5/2017 | Hayashi et al. |
| 2020/0032117 A1 | 1/2020 | Czaplicki et al. |
| 2021/0301072 A1 | 9/2021 | Czaplicki |
| 2023/0392045 A9 | 12/2023 | Miller et al. |

FOREIGN PATENT DOCUMENTS

| | | |
|---|---|---|
| CN | 102227457 A | 10/2011 |
| CN | 103459539 A1 | 12/2013 |
| CN | 106133021 A | 11/2016 |
| EP | 20090729501 | 1/2011 |

(Continued)

OTHER PUBLICATIONS

Huntsman, "Advanced Materials Araldite GT 7071", Sep. 2012. (Year: 2012).*
Huntsman, "Advanced Materials High Performance Components North America", 2010. (Year: 2010).*
Gulyas et al., TW 201425449 A machine translation in English used for citation, Jul. 1, 2014. (Year: 2014).*
Chinese First Office Action & Search Report dated Jan. 19, 2023, Application No. 201980052041.6.

(Continued)

*Primary Examiner* — David T Karst

(74) *Attorney, Agent, or Firm* — The Dobrusin Law Firm, PC

(57) ABSTRACT

A material comprising at least about 10% by weight polyvinyl butyral, a thermoplastic epoxy, wherein the ratio of polyvinyl butyral to thermoplastic epoxy is about 1 to 10 to about 1 to 4, and at least 2% but less than 15% by weight adducted carboxyl-terminated polymer, wherein the material has a strain to failure of greater than 2% and a modulus of at least 700 MPa.

19 Claims, No Drawings

(56) References Cited

FOREIGN PATENT DOCUMENTS

| | | | |
|---|---|---|---|
| EP | 3170860 B1 | 7/2020 | |
| EP | 2888328 B1 | 8/2020 | |
| EP | 3170657 B1 | 9/2020 | |
| EP | 2914676 B1 | 10/2020 | |
| EP | 3798255 A1 | 3/2021 | |
| EP | 2658939 B1 | 6/2021 | |
| EP | 3243885 B1 | 8/2021 | |
| EP | 3180393 B1 | 9/2021 | |
| EP | 3670564 B1 | 9/2021 | |
| EP | 3377588 B1 | 5/2023 | |
| JP | 5941181 B1 | 6/2016 | |
| JP | 2018203929 A | 12/2018 | |
| TW | 201425449 A | * 7/2014 | ............ C08G 59/42 |
| WO | 2012110230 A1 | 8/2012 | |
| WO | 2016055535 A1 | 4/2016 | |
| WO | 2020/033393 A1 | 2/2020 | |

OTHER PUBLICATIONS

PCT Search Report & Written Opinion dated Nov. 7, 2019, Application No. PCT/US2019/045285.
Japanese Office Action dated Jun. 15, 2023, Application No. 2021-500996.
Chinese Second Office Action dated Aug. 18, 2023, Application No. 201980052041.6.
Japanese Decision of Rejection dated Feb. 26, 2024, Application No. 2021-500996.
Chinese Office Action dated Feb. 1, 2024, Application No. 201980052041.6.

* cited by examiner

HIGH ELASTIC MODULUS STRUCTURAL FOAM MATERIALS WITH IMPROVED STRAIN TO FAILURE

FIELD OF THE INVENTION

The present teachings relates generally to an activatable material, a method of forming the activatable material and a method of using the activatable material for baffling, adhering or reinforcing of components of articles of manufacture such as automotive vehicles, the activatable material having improved adhesion durability.

BACKGROUND OF THE INVENTION

For many years industry, and particularly the transportation industry has been concerned with acoustic attenuation, adhesion and reinforcement of articles of manufacture such as automotive vehicles. In turn, industry has developed a wide variety of materials for providing such sound baffling, adhesion, and reinforcement. Some of the more desirable properties for adhesion and reinforcing materials include high tensile modulus, high strain to failure, and adhesion durability. These properties have a generally inverse relationship where an increase in one often produces a decrease in the other. It would be desirable to have a material that provided increased tensile modulus, concurrent increased strain to failure, peel resistance, impact resistance, fracture toughness while maintaining or improving adhesion durability.

The present invention, therefore, seeks to provide an improved material for baffling, adhesion and/or reinforcement that provides for increased tensile modulus, strain to failure, and adhesion durability as compared to existing materials.

SUMMARY OF THE INVENTION

The teachings herein provide for a material comprising at least about 10% by weight polyvinyl butyral and a thermoplastic epoxy, wherein the ratio of polyvinyl butyral to thermoplastic epoxy is about 1 to 10 to about 1 to 4; and at least 2% but less than 15% by weight adducted carboxyl-terminated polymer (e.g., an adduct of a carboxyl-terminated polymer and an epoxide terminated molecule). The material has a strain to failure of greater than about 2% and a modulus of at least about 700 MPa (a measure that may be affected by the amount of foaming during curing).

The material may include a curing agent. The material may contain from about 15% to about 30% by weight of polyvinyl butyral. The material may have a strain to failure of at least about 3%. The material may have a modulus of at least about 900 MPa. The material may include a polymeric particle, the polymeric particle being present in an amount of from about 5% to about 30% by weight of the material. As used herein, the term "polymeric particle" is defined as a particle comprising a polymeric material, the particle being selected to improve one or more of fracture toughness (e.g., mode 1 $G1_c$ fracture toughness), peel resistance and impact resistance. The polymeric particle may include core shell rubber particles averaging about 200 nm in size. The polymeric particle may be substantially free of any agglomerated particles (e.g., a deagglomerated polymeric particle).

The material may include an epoxy/elastomer adduct or an epoxy/elastomer blend. The elastomer in the adduct may be selected from styrene butadiene rubber, polysulfide, polybutadiene, acrylics, natural rubber, CTBN, polysiloxanes, polyester, urethane prepolymers, or any combination thereof. The material may include an adducted carboxyl-terminated polymer.

The material may include a curing agent in the range of about 0.5% to about 5.0% by weight of the material. The material may include a blowing agent. The material may include a blowing agent in the range of about 0.5% to about 5.0% by weight of the material.

The material when cured may exhibit a tensile modulus from about 700 MPa to about 3000 MPa. The material when cured may exhibit a lap shear strength of at least about 400 psi. The material may exhibit a volume expansion from a green state to an expanded state of about 100% to about 500%. The material may exhibit a T-Peel strength when cured of at least about 4 N/mm. The improved T-Peel strength may be a result of the combination of polyvinyl butyral, adducted carboxyl-terminated polymer, and the polymeric particle. The improved strain to failure may be as a result of the combination of the adducted carboxyl-terminated polymer, the epoxy/elastomer adduct, and the thermoplastic epoxy. The material may foam upon exposure to a stimulus. The material may include a flexibilizer.

The material may include one or more materials for reinforcing the material, directing expansion of the material, controlling the flow of the material, and/or modifying the viscosity of the material (e.g., one or more reinforcement components). The one or more reinforcement components may be selected from mineral reinforcements such as diatomaceous earth, clay (e.g., including nanoclay), pyrophyllite, sauconite, saponite, nontronite, wollastonite, or montmorillonite. The reinforcement component may include a silica and/or calcium mineral reinforcement. The reinforcement component may include glass, glass beads or bubbles, carbon or ceramic fibers, nylon, aramid or polyamide fibers (e.g., Kevlar). The reinforcement component may be wollastonite. The reinforcement component may be a fiber with an aspect ratio of from about 20:1 to about 3:1. The reinforcement component may be a fiber with an aspect ratio of from about 15:1 to about 10:1. The reinforcement component may be a fiber with an aspect ratio of about 12:1. It is possible that the reinforcement component improves a first physical characteristic while simultaneously substantially avoiding any significant detrimental effect on a second physical characteristic. As one example, the selected reinforcement component may improve the overall modulus of the material while still having minimal detrimental on strain to failure. The material may further include one or more fillers including pigments or colorants, calcium carbonate, talc, silicate minerals, vermiculite, mica, or the like.

The polyvinyl butyral component may be present in a specific ratio with the thermoplastic epoxy. The ratio of polyvinyl butyral to thermoplastic epoxy may be about 3 to 7 parts polyvinyl butyral to about 1 to 2 parts thermoplastic epoxy. The ratio of the adducted carboxyl-terminated polymer to the mineral reinforcement may be from about 1 to 10 parts adducted carboxyl-terminated polymer to about 1 to 4 parts mineral reinforcement. The ratio of the adducted carboxyl-terminated polymer to the mineral reinforcement may be from about 3 to 7 parts adducted carboxyl-terminated polymer to about 1 to 2 parts mineral reinforcement. The ratio of the epoxy/elastomer adduct to the thermoplastic epoxy may be from about 1 to 10 parts epoxy/elastomer adduct to about 1 to 4 parts thermoplastic epoxy. The ratio of the epoxy/elastomer adduct to the thermoplastic epoxy may be from about 3 to 7 parts epoxy/elastomer adduct to about 1 to 2 parts thermoplastic epoxy.

The teachings herein further provide for use of any of the materials described herein as an adhesive. The teachings herein further provide for use of any of the materials described herein for adhering members in a transportation vehicle.

The teachings herein provide for a method for adhering a first substrate to a second substrate including: applying the material described herein to the first substrate; then activating the material; then contacting the material to the second substrate.

The teachings herein are also directed to a material comprising: less than about 30% by weight of a polymeric particle including core shell rubber particles dispersed in bisphenol A epoxy resin; at least about 10% by weight polyvinyl butyral; a thermoplastic epoxy; an adducted carboxyl-terminated polymer; and a mineral reinforcement.

The teachings herein are further directed to a material comprising, at least about 10% by weight polyvinyl butyral, at least about 10% by weight polymeric particle, at least 2% but less than about 15% by weight carboxyl-terminated adduct. The material may have a modulus at 80° C. of at least 350 MPa.

The material may include at least 2% by weight thermoplastic epoxy. The material may include one or more mineral reinforcements. The material may have a strain to failure of greater than 2%. The material may include one or more mineral reinforcements and one or more fiber reinforcing components. The ratio of the mineral reinforcement to the fiber reinforcing component may be from about 3 to 7 parts mineral reinforcement to about 1 to 2 parts fiber reinforcing component.

DETAILED DESCRIPTION

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. Percentages herein refer to weight percent, unless otherwise indicated.

The present invention is predicated upon provision of an improved material (e.g., an activatable material), and articles incorporating the same. The activatable material may assist in providing structural reinforcement, adhesion, baffling, acoustical damping properties or a combination thereof within a cavity of, or upon a surface of a structure, or to one or more structural members of an article of manufacture. As used herein, the phrase activatable material includes any material that may be activated to melt, flow, cure (e.g., thermoset), expand, foam or a combination thereof by an ambient condition or another condition. For example, the material may expand, foam, flow, melt, cure, develop adhesion, a combination thereof or the like upon exposure to a condition such as heat, pressure, chemical exposure, combinations thereof or the like.

The activatable material typically includes a polymeric particle, polyvinyl butyral, and an adducted carboxyl-terminated polymer. The activatable material may further include one or a combination of an epoxy/elastomer adduct, a flexibilizer, a thermoplastic epoxy, a phenoxy resin, a blowing agent, a curing agent, one or more reinforcement components and one or more fillers.

The activatable material of the present teachings may be applied to various articles of manufacture for adding structural integrity to portions or members of the articles. Examples of such articles of manufacture include, without limitation, household or industrial appliances, furniture, storage containers, buildings, structures, or the like. The activatable material may be applied to portions of an automotive vehicle such as body or frame members (e.g., a vehicle frame rail) of the automotive vehicle. One method of the present teachings contemplates applying the activatable material to a surface of one of the above structures in an unexpanded or partially expanded state and activating the material for expanding (e.g., foaming) it to a volume greater than its volume in the unexpanded state (e.g., at least 5% greater, at least 20% greater, at least 50% greater, at least 100% greater, at least 200% greater, at least 400% greater or higher). It is also typically preferred, at least for reinforcement applications, that the volumetric expansion is less than 800%, more typically less than 500%, even more typically less than 400% and possibly less than 300% relative to the original unexpanded volume. It is also contemplated that the volume of the material may be less after activation due to curing (e.g., cross-linking) for foamed or unfoamed versions of the activatable material.

The material may be formulated to include an adduct, which may be an epoxy elastomer adduct. The epoxy elastomer adduct may impart a plasticization effect to the activatable material and the ability to initiate plastic deformation. Also, it may phase separate during cure to product discrete elastomeric particles that are effective for improving fracture toughness and impact resistance. Various epoxy/elastomer adducts may be employed in the present teachings. The epoxy/elastomer hybrid or adduct may be included in an amount of up to about 75% by weight of the activatable material. The epoxy elastomer adduct may be approximately at least about 5% by weight, more typically at least about 10% by weight, more typically at least about 15% by weight, and even more typically at least about 20% by weight of the activatable material. The epoxy elastomer adduct may be approximately about 75% or less by weight, more typically about 70% or less by weight, more typically about 65% or less by weight, and even more typically 60% or less by weight of the activatable material. The elastomer-containing adduct may be a combination of two or more particular adducts. The adducts may be solid adducts, liquid adducts or semisolids at a temperature of 23° C. or may also be some combination thereof. It is possible that the adduct is composed of substantially entirely (i.e., at least 70%, 80%, 90% or more) of one or more adducts that are solid at a temperature of 23° C. The adduct may be used together with a polymeric particle, such as methacrylate-butadiene-styrene (MBS), and a polymeric material such as polyvinyl butyral (PVB), which may achieve desirable adhesive performance and physical properties over a wide range of temperatures, even when employing a relatively small amount of the adduct.

The adduct itself generally includes about 1:5 to 5:1 parts of epoxy to elastomer, and more preferably about 1:3 to 3:1 parts of epoxy to elastomer. More typically, the adduct includes at least about 10%, more typically at least about 20% and or even at least about 30% elastomer and also typically includes not greater than about 60%, although higher or lower percentages are possible. The elastomer compound suitable for the adduct may contain reactive functionality. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. Examples of additional or alternative epoxy/elastomer or other adducts suitable for use in the present teachings are disclosed in United States Patent Publication 2004/0204551.

The elastomer-containing adduct is included to modify structural properties of the activatable material such as strength, strain-to-failure, fracture toughness ($G_{1c}$), peel, adhesion durability, uncured-material integrity (less likely to stick, break or deform before use), stiffness, or other properties. Carboxyl-terminated butadiene-acrylonitrile (CTBN) and adducts thereof are particularly useful for developing adhesion to contaminated surfaces, especially with stamping lubricants typical to the automotive industry.

Generally, it is preferable for the activatable to include at least one type of polymeric particle. Such polymeric particles may be utilized to improve fracture toughness ($G_{1C}$), peel resistance and impact resistance. As used herein, like with any other ingredients of the present teachings, the term "polymeric particle" can include one or more types of polymeric particles. Various types of polymeric particles may be employed in the practice of the present teachings and often include one or more elastomers. It is generally preferable for the polymeric particles to be at least 4%, more typically at least 7%, even more typically at least 10%, still more typically at least 13% and even still more typically at least 16% by weight of the activatable material and also preferable for the polymeric particle to be less than 90%, more typically less than 40% an even more typically less than 30% by weight of the activatable material, although higher or lower amounts may be used in particular embodiments.

The polymeric particle may include one or more core/shell polymers which may be pre-dispersed in an epoxy. The process for forming the core shell materials in a liquid epoxy avoids agglomeration of the core shell particles as may be common with "dry" core shell polymeric particles (e.g., agglomeration may occur during the drying process). An example of products made by this process may be described in one or more of U.S. Pat. Nos. 3,984,497; 4,096,202; 4,034,013; 3,944,631; 4,306,040; 4,495,324; 4,304,709; and 4,536,436. The polymeric particles may be formed through an emulsion polymerization process. This process may include the addition of a solvent with the resin. As a result of incompatibility between the resin/solvent and water, the water settles out of the material as the core shell particles move into the resin, resulting in reduced agglomeration. Alternatively, a high speed dispersion can be effective at de-agglomerating core/shell materials. However a surfactant may remain post spray drying or coagulating the core/shell material. This residual surfactant may be detrimental for the material's resistance to environmental exposure conditions that involve water such as salt spray and humidity. Materials not exposed to the environmental exposure conditions would typically not show a difference between dry core shell and liquid core shell masterbatch provided that there is sufficient de-agglomeration of the dry material.

As used herein, the term core shell polymer may denote a polymeric material wherein a substantial portion (e.g., greater than 30%, 50%, 70% or more by weight) thereof may be comprised of a first polymeric material (i.e., the first or core material) that may be substantially entirely encapsulated by a second polymeric material (i.e., the second or shell material). The first and second polymeric materials, as used herein, may be comprised of one, two, three or more polymers that are combined and/or reacted together (e.g., sequentially polymerized) or may be part of separate or same core/shell systems. The core/shell polymer should be compatible with the formulation and preferably has a ductile core and a rigid shell which has favorable adhesion with the other components of the activatable material.

The first and second polymeric materials of the core/shell polymer can include elastomers, polymers, thermoplastics, copolymers, other components, or combinations thereof. The first polymeric material, the second polymeric material or both may include or may be substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes, or combinations thereof.

Examples of useful core-shell graft copolymers may be those where hard containing compounds, such as styrene, acrylonitrile or methyl methacrylate, may be grafted onto a core made from polymers of soft or elastomeric compounds such as butadiene or butyl acrylate. U.S. Pat. No. 3,985,703, describes useful core-shell polymers, the cores of which are made from butyl acrylate but can be based on ethyl isobutyl, 2-ethylhexyl or other alkyl acrylates or mixtures thereof. The core polymer, may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl acrylates such as methyl methacrylate and optionally other alkyl acrylates and methacrytates, such as ethyl, butyl, or mixtures thereof acrylates or methacrylates as these materials are compatible with the phenoxy resin and any epoxy resins that are used in the formulation. Up to 40 percent by weight or more of the shell monomers may be styrene, vinyl acetate, vinyl chloride, and the like. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin may generally have a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and mixtures thereof.

Examples of useful core/shell polymers include, but are not limited to those sold under the tradename, Kane Ace, commercially available from Kaneka. Particularly preferred grades of Kane Ace core/shell are sold under the designations MX-257 and M711 or Clear Strength E-950 available from Arkema. The core/shell polymer may be from about 5% to about 30% by weight of the activatable material.

The activatable material may include a polymer, or other additive for increasing strength, strain to failure, and/or expansion properties. The additive may allow the material to have an improved balance between Young's modulus (as measured by ASTM D638) and strain to failure as compared to materials without the additive. For example, the additive may allow both modulus and strain to failure to be increased simultaneously as opposed to a material without the additive. After curing, the material may exhibit a tensile modulus of at least about 500 MPa, more typically at least about 700 MPa, and even more typically at least about 900 MPa. After curing, the material may exhibit a tensile modulus of about 1500 MPa or less, more typically about 1200 MPa or less, and even about 1000 MPa or less. The additive may allow the activatable material to have a higher volumetric expansion during activation as compared to a material without the additive. The additive may allow for increased volumetric expansion while increasing or at least maintaining modulus. After curing, the activatable material may exhibit a volumetric expansion from the pre-cured state of at least about 200%, more typically least about 250%, and more typically at least about 300%, and even more typically at least about 330%. After curing, the activatable material may exhibit a volumetric expansion from the pre-cured state of about 500% or less, more typically about 450% or less, more typically about 400% or less, and even more typically about 300% or less.

The additive may assist in providing desirable physical properties to the activatable material, especially when used in combination with a core/shell polymeric particle, the epoxy-elastomer adduct, or both. The additive for increasing modulus, strain to failure, and/or volumetric expansion may be any additive capable of achieving both while maintaining other desired properties of the activatable material. An exemplary additive is polyvinyl butyral (PVB). Polyvinyl butyral may be approximately at least about 5% by weight, more typically at least about 10% by weight, and even more typically at least about 15% by weight of the activatable material. Polyvinyl butyral may be approximately about 30% or less by weight, more typically about 25% or less by weight, and even about 20% or less by weight of the activatable material. A suitable example of polyvinyl butyral may include CCP Polyvinyl Butyral resin B08HX.

The material may include a flexibilizer. The use of the term flexibilizer can relate to a single flexibilizer or a combination of multiple different flexibilizers. Although other flexibilizers may be employed, preferred flexibilizers include polymers that are amine modified, epoxy modified, or both. These polymers can include thermoplastics, thermosets or thermosettables, elastomers, combinations thereof or the like. These polymers may be modified with aromatic or non-aromatic epoxy and/or may be modified with bisphenol-F type, bisphenol-A type, combinations thereof or other type epoxy. Examples of preferred flexibilizer are epoxidized polysulfides sold under the tradenames EPS-350 and EPS-80, commercially available from Akzo Nobel.

Phenol-containing molecules such as the flexibilizer Rez-Cure EP 1820 (available from Innovative Resin Systems) are one possible material that may be utilized. An example of another preferred flexibilizer is an epoxy-dimer acid elastomer sold under the tradenames HYPOX DA 323, commercially available from CVC Specialty Chemicals. An example of other preferred flexibilizers are polyurethane modified epoxies sold under the tradenames GME-3210 and GME-3220, commercially available from GNS Technologies. From experimental results it has been observed that a polyurethane modified epoxy flexibilizer is capable of improving impact strength (particularly as demonstrated by a wedge impact test) while at the same time having a minimal effect on the reduction of glass transition temperature. Yet further examples of preferred flexibilizer are amine or epoxy terminated polyethers such as JEFFAMINE D-2000, commercially available from Huntsman and DER 732, commercially available from the Dow Chemical Company. Flexibilizers based on cashew nutshell liquid such as the epoxidized liquids Cardolite NC-514 and Cardolite Lite 2513 HP are also useful flexibilizers. All of the individual flexibilizers discussed herein may be used separately or in combination with each other in the material of the present invention, unless otherwise stated.

Typically, the flexibilizer is at least 1%, more typically at least 2% and even possibly at least 5% by weight of the material but is typically less than 50%, more typically less than 35% and even possibly less than 20% by weight of the material, although higher and lower values may also be possible unless otherwise stated. It is also contemplated in particular that the amount of flexibilizing agent may be higher in embodiments where the agent is modified with an epoxy component.

The material described herein includes a base resin comprising one or more epoxide functional materials and polyvinyl butyral. An epoxy resin (e.g., an epoxy resin that is distinct from any epoxy resin included as part of the polymeric particle composition) may be added to the activatable material to increase the adhesion, adhesion durability, flow properties or some combination thereof of the material. The epoxy material may further act as component to a crosslinking network upon cure of the material. One exemplary epoxy resin may be a phenolic resin, which may be a novolac type or other type resin. Other preferred epoxy containing materials may include a bisphenol-A epichlorohydrin ether polymer, or a bisphenol-A epoxy resin which may be modified with butadiene or another polymeric additive or bisphenol-F-type epoxy resins. Moreover, various mixtures of several different epoxy resins may be employed as well. The epoxy resins may be silane modified epoxy resins or silicone free epoxy resins. For example, a silane modified epoxy resin may aid in allowing the activatable material to adhere to metal, such as to aluminum. The epoxy resins may have been pre-reacted with carboxylic acid group-containing molecules.

The material may include a phenoxy resin component. Phenoxy resins are high molecular weight thermoplastic condensation products of bisphenol A and epichloro-hydrin and their derivatives. The phenoxy resins that may be employed may be of the basic formula:

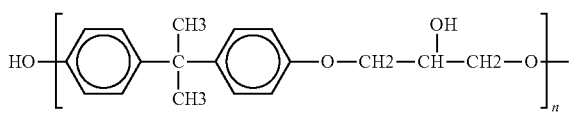

where n is typically from 30 to 100 preferably from 50 to 90. Modified phenoxy resins may also be used. Examples of phenoxy resins that may be used are products marketed by Inchem Corp. Examples of suitable materials are the PKHB, PKHC, PKHH, PKHJ, PKHP pellets and powder. Alternatively phenoxy/polyester hybrids and epoxy/phenoxy hybrids may be used. In order to enhance the production of the activatable material it is preferred that the phenoxy resin be supplied to the other components as a solution. While any solvent may be used it is particularly preferred to use a liquid epoxy resin as the solvent as this can also contribute to the adhesive properties upon activation.

One or more blowing agents may be added to the activatable material for producing inert gasses that form, as desired, an open and/or closed cellular structure within the activatable material. In this manner, it may be possible to modify the density of articles fabricated from the material as required for a particular application.

The blowing agent may include one or more nitrogen containing groups such as amides, amines and the like. Examples of suitable blowing agents include azodicarbonamide, dinitrosopentamethylenetetramine, 4,4,-oxy-bis-(benzenesulphonylhydrazide), trihydrazinotriazine and N,N,-dimethyl-N,N,-dinitrosoterephthalamide. The material may include a physical blowing agent, including but not limited to agents such as Expancel® available from AkzoNobel. Alternatively, the material may be manufactured according to the MuCell® process available from Trexel.

An accelerator for the blowing agents may also be provided in the activatable material. Various accelerators may be used to increase the rate and/or reduce the temperature at which the blowing agents form inert gasses. One preferred blowing agent accelerator is a metal salt, or is an oxide, e.g. a metal oxide, such as zinc oxide. Other preferred accelerators include modified and unmodified thiazoles, ureas and imidazoles.

Amounts of blowing agents and blowing agent accelerators can vary widely within the activatable material depending upon the type of cellular structure desired, the desired amount of expansion of the activatable material, the desired rate of expansion and the like. Exemplary ranges for the amounts of blowing agents and blowing agent accelerators in the activatable material range from about 0.001% by weight to about 5% by weight and are preferably in the activatable material in fractions of weight percentages. The blowing agent may be at least about 0.5% by weight, more typically at least about 1% by weight, and even more typically about 1.2% by weight of the activatable material. The blowing agent may be about 2.5% or less by weight, more typically about 2.0% or less by weight, and even more typically about 1.8% or less by weight of the activatable material. Exemplary blowing agents may include Cellcom CF810 and Celogen® 754A.

The present teachings also contemplate the omission of a blowing agent. Preferably, however, the material, the blowing agent or both of the present teachings are thermally activated. Alternatively, other agents may be employed for realizing activation by other means, such as moisture, radiation, or otherwise.

The activatable material may include one or more additional polymers or copolymers, which can include a variety of different polymers, such as thermoplastics, elastomers, plastomers combinations thereof or the like. For example, and without limitation, polymers that might be appropriately incorporated include halogenated polymers, polycarbonates, polyketones, urethanes, polyesters, silanes, sulfones, allyls, olefins, styrenes, acrylates, methacrylates, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

When used, these polymers can comprise a small portion or a more substantial portion of the expandable material (e.g., up to 85% by weight or greater). Preferably, the one or more additional polymers comprises about 0.1% to about 50%, more preferably about 1% to about 20% and even more preferably about 2% to about 10% by weight of the activatable material.

In certain embodiments, it may be desirable to include one or more thermoplastic polyethers and/or thermoplastic epoxy resins in the activatable material. When included, the one or more thermoplastic polyethers preferably comprise between about 1% and about 90% by weight of the activatable material, more preferably between about 3% and about 60% by weight of the activatable material and even more preferably between about 4% and about 25% by weight of the activatable material. As with the other materials, however, more or less thermoplastic polyether may be employed depending upon the intended use of the activatable material.

The thermoplastic polyethers typically include pendant hydroxyl moieties. The thermoplastic polyethers may also include aromatic ether/amine repeating units in their backbones. The thermoplastic polyethers of the present teachings preferably have a melt index between about 1 and about 300, more preferably between about 5 and about 250 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine or other monoamines and a diglycidyl ether, combinations thereof or the like.

According to one embodiment, the thermoplastic polyether is formed by reacting a primary amine, a bis (secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed based on the stoichiometric ratio choice for the reactive monomers.

Examples of preferred thermoplastic polyethers and their methods of formation are disclosed in U.S. Pat. Nos. 5,275,853; 5,464,924 and 5,962,093, which are incorporated herein by reference for all purposes. Advantageously, the thermoplastic polyethers can provide the activatable material with various desirable characteristics such as desirable physical and chemical properties for a wide variety of applications as is further described herein.

One or more curing agents and/or curing agent accelerators may be added to the activatable material. Amounts of curing agents and curing agent accelerators can, like the blowing agents, vary widely within the activatable material depending upon the type of cellular structure desired, the desired amount of expansion of the activatable material, the desired rate of expansion, the desired structural properties of the activatable material and the like. Exemplary ranges for the curing agents or curing agent accelerators present in the activatable material range from about 0.001% by weight to about 7% by weight.

It is possible that the curing agents assist the activatable material in curing by crosslinking of the polymers, epoxy resins or both. It is also possible for the curing agents to assist in advancing or chain extending the activatable material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the activatable material.

The activatable material may also include one or more reinforcement components. Preferably the reinforcement components include a material that is generally non-reactive with the other components present in the activatable material. It is contemplated that the reinforcement components may also impart properties such as strength and impact resistance to the activatable material.

Examples of reinforcement components include wollastonite, silica, diatomaceous earth, glass, clay (e.g., including nanoclay), glass beads or bubbles, glass, carbon or ceramic fibers, nylon, aramid or polyamide fibers, and the like. The one or more reinforcement components may be selected from mineral reinforcements such as diatomaceous earth, clay (e.g., including nanoclay), pyrophyllite, sauconite, saponite, nontronite, wollastonite, or montmorillonite. The reinforcement component may include a silica and/or calcium mineral reinforcement. The reinforcement component may include glass, glass beads or bubbles, carbon or ceramic fibers, nylon, aramid or polyamide fibers (e.g., Kevlar). The reinforcement component may be wollastonite. The reinforcement component may be a fiber with an aspect ratio of from about 20:1 to about 3:1. The reinforcement component may be a fiber with an aspect ratio of from about 15:1 to about 10:1. The reinforcement component may be a fiber with an aspect ratio of about 12:1. It is possible that the reinforcement component improves a first physical characteristic while simultaneously substantially avoiding any significant detrimental effect on a second physical characteristic. As one example, the selected reinforcement component may improve the overall modulus of the material while still having minimal detrimental effect on strain to failure. The material may further include one or more fillers including pigments or colorants, calcium carbonate, talc, silicate minerals, vermiculite, mica, or the like.

When employed, the reinforcement components in the activatable material can range from 10% or less to 90% or greater by weight of the activatable material, but more typical from about 20% to 55% by weight of the activatable material. According to some embodiments, the activatable material may include from about 0% to about 30% by weight, and more preferably slightly less than 10% by weight reinforcement components.

It is contemplated that most nearly any additional chemicals, materials or otherwise may be added to the activatable material assuming they are suitable for the activatable material and suitable for a chosen application of the activatable material.

Other additives, agents or performance modifiers may also be included in the activatable material as desired, including but not limited to a UV resistant agent, a flame retardant, a polymeric particle, a heat stabilizer, a colorant, a processing aid, a lubricant or the like.

It is possible that the specific combination and relative amounts of one or more materials described herein, may assist in providing improved values for one or more tensile modulus, adhesion durability, T-peel, strain to failure, or lapshear. As one example the combination of polyvinyl butyral and a thermoplastic epoxy may increase tensile modulus and improve T-peel. The ratio of polyvinyl butyral to thermoplastic epoxy may be about 1 to 10 parts polyvinyl butyral to about 1 to 4 parts thermoplastic epoxy. The ratio of polyvinyl butyral to thermoplastic epoxy may be about 3 to 7 parts polyvinyl butyral to about 1 to 2 parts thermoplastic epoxy. As another example, the combination of adducted carboxyl-terminated polymer and mineral reinforcement may assist in imparting improved strain to failure rate. The ratio of the adducted carboxyl-terminated polymer to the mineral filler may be from about 1 to 4 parts adducted carboxyl-terminated polymer to about 1 to 10 parts mineral reinforcement. The ratio of the adducted carboxyl-terminated polymer to the mineral reinforcement may be from about 1 to 2 parts adducted carboxyl-terminated polymer to about 4 to 7 parts mineral reinforcement. As another example, the combination of epoxy/elastomer adduct and thermoplastic epoxy may assist in imparting improved strain to failure rate and T-peel. The ratio of the epoxy/elastomer adduct to the thermoplastic epoxy is from about 1 to 10 parts adduct to about 1 to 4 parts thermoplastic epoxy. The ratio of the epoxy/elastomer adduct to the thermoplastic epoxy may be from about 3 to 7 parts adduct to about 1 to 2 parts thermoplastic epoxy.

When determining appropriate components for the activatable material, it may be important to form the material such that it will only activate (e.g., flow, foam, advance, crosslink or otherwise change states) at appropriate times or temperatures. For instance, in some applications, it is undesirable for the material to be reactive at room temperature or otherwise at the ambient temperature in a production environment. More typically, the activatable material becomes activated to flow and develop adhesion at higher exposure temperatures. As an example, temperatures such as those encountered in an automobile assembly plant may be appropriate, especially when the activatable material is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher.

Formation of the activatable material can be accomplished according to a variety of new or known techniques. Preferably, the activatable material is formed as a material of substantially homogeneous composition. However, it is contemplated that various combining techniques may be used to increase or decrease the concentration of certain components in certain locations of the activatable material.

According to another embodiment, the activatable material may be formed by heating one or more of the components that is generally easier to soften or liquidize such as the polymer based materials to induce those components into a mixable state. Thereafter, the remaining components may then be intermixed with the softened components. The material may be compounded using a melt processing operation such as a twin screw, a double arm mixer, or some other solution compounding machine.

Depending upon the components used, it may be important to assure that the temperature of the components remains below certain activation temperatures that might cause the activatable material to activate (e.g., form gasses, flow, cure or otherwise activate) or both. Notably, when the activatable material contains a blowing agent, it is typically desirable to maintain the temperature of the activatable material below a temperature that will activate the blowing agent and/or curing agent(s) (e.g., anything that would begin the advancement of the molecular weight of a polymeric material (any reaction within the material) during formation of the activatable material or before the activatable material is applied to a surface. In situations where it is desirable to maintain the activatable material at lower temperatures it may be desirable to maintain the components in a semi-solid or viscoelastic state using pressure or a combination of pressure and heat to intermix the components of the activatable material. Various machines have been designed to avoid applying heat, pressure or both to materials.

The strain to failure may be measured by performing a tensile test (ISO 527 for example) while using an extensometer to record the deformation that is then used to calculate the material strain. The lap shear may be measured using a modification of ASTM D-1002 and involves taking two coupons, providing a molding of the activatable material in between the metal coupons and curing the material. The bondline is the thickness of the material (following the curing process). The metal coupons are gripped in a mechanical testing machine and pulled apart. The maximum stress is measured by dividing the peak load by the overlap area. T-peel may be measured using a modification of ASTM D-1876 in which two coupons are bent to an L-shape. Uncured activatable material is provided onto the long part of the coupon. The two metal coupons are put together to make a T-shape. The metal coupons are cured to create a T-shaped test specimen. The bondline is the thickness of the cured material. The two legs of the T-shape are put into testing grips in a mechanical testing machine and pulled apart. The average force per material width is calculated from this test.

EXAMPLES

Table 1 shows a variety of exemplary formulations and comparative examples in accordance with the present teachings and their associated physical properties. All amounts shown are in weight percent (wt. %) unless otherwise indicated.

TABLE 1

| Example | A | B | C | D | E | F | G | H |
|---|---|---|---|---|---|---|---|---|
| Thermoplastic Epoxy | 3.56 | 0 | 4.39 | 3.62 | 3.53 | 3.74 | 3.66 | 3.51 |
| Epoxy Adduct | 18.98 | 19.68 | 0 | 19.32 | 18.81 | 19.93 | 19.52 | 18.72 |
| Phenoxy | 1.78 | 1.85 | 2.20 | 0 | 2.65 | 1.87 | 1.83 | 1.76 |
| Adducted carboxyl terminated polymer | 4.77 | 4.95 | 5.89 | 4.86 | 4.73 | 0 | 4.91 | 4.70 |
| Flexibilizer | 2.77 | 2.87 | 3.42 | 2.82 | 2.75 | 2.91 | 0 | 4.10 |
| Polyvinyl butyral | 17.78 | 18.44 | 21.95 | 18.10 | 17.62 | 18.67 | 18.29 | 17.54 |
| Fiber Reinforcement Component | 1.78 | 1.85 | 2.20 | 1.81 | 1.76 | 1.87 | 1.83 | 1.76 |
| Polymeric particle | 19.09 | 19.79 | 23.56 | 19.44 | 18.92 | 20.05 | 19.63 | 18.83 |
| Mineral reinforcement component | 25.26 | 26.19 | 31.18 | 25.72 | 25.04 | 26.53 | 25.98 | 24.91 |
| Curing agent | 1.92 | 1.99 | 2.37 | 1.95 | 1.90 | 2.02 | 1.97 | 1.89 |
| Curing agent accelerator | 0.53 | 0.55 | 0.65 | 0.54 | 0.53 | 0.56 | 0.55 | 0.52 |
| Blowing agent | 1.75 | 1.81 | 2.16 | 1.78 | 1.73 | 1.84 | 1.80 | 1.73 |
| Pigment | 0.03 | 0.03 | 0.04 | 0.03 | 0.03 | 0.03 | 0.03 | 0.03 |
| Total | 100.0 | 100.0 | 100.0 | 100.0 | 100.0 | 100.0 | 100.0 | 100.0 |

TABLE 2 below shows resulting characteristics of the formulated materials of Table 1.

| Example | A | B | C | D | E | F | G | H |
|---|---|---|---|---|---|---|---|---|
| Volume expansion (%) | 321 | 359 | 113 | 278 | 335 | 321 | 333 | 319 |
| Uncured density (g/cc) | 1.33 | 1.34 | 1.39 | 1.33 | 1.33 | 1.35 | 1.34 | 1.33 |
| Volume expansion, 3D @43° C. | 273 | 368 | 87 | 213 | 276 | 303 | 223 | 288 |
| % retention DMA Tg ° C. | 85 | 103 | 77 | 77 | 82 | 94 | 67 | 90 |
| Start MPa | 756 | 604.2 | 1256 | 638.8 | 660.6 | 1005 | 782 | 802.1 |
| 40° C. MPa | 675.5 | 514.6 | 963.9 | 504.6 | 551 | 894.3 | 695 | 709.1 |
| 60° C. MPa | 347.3 | 245.8 | 318.9 | 198.3 | 217.7 | 673.2 | 446.3 | 305.4 |
| 80° C. MPa | 63.56 | 32.65 | 63.54 | 50.12 | 47.3 | 198.3 | 88.42 | 62.44 |
| 100° C. MPa | 16.57 | 6.06 | 10.51 | 11.67 | 12.41 | 52.92 | 14.96 | 15.7 |
| Shear strength (psi)61MalHcl/% cohesive failure | 873/100 | 447/95 | 748/25 | 736/100 | 851/100 | 661/100 | 650/85 | 693/100 |
| 10 Day Humidity 61MalHcl/% cohesive failure | 558/50 | 360/80 | 427/15 | 609/65 | 636/75 | 400/7 | 502/50 | 524/50 |
| % Retention | 43 | 74 | 34 | 57 | 64 | 33 | 45 | 60 |
| Peel Strength (N/mm)61MalHcl/% cohesive failure | 5.2/95 | 3.93/100 | 3.16/ Light cohesive failure | 4.55/100 | 5.26/100 | 3.5/80 | 4.38/90 | 5.25/95 |
| Tensile Modulus (MPa) | 1190 | 731 | 1856 | 926 | 1037 | 1176 | 1038 | 948 |
| Tensile elongation (%) | 2.91 | 1.65 | 4.09 | 2.94 | 2.5 | 2.43 | 2.55 | 3.37 |
| Tensile strength (MPa) | 10.13 | 6.12 | 16.46 | 8.6 | 9.28 | 10.32 | 9.46 | 9.11 |

Table 3 shows a variety of exemplary formulations and comparative examples in accordance with the present teachings and their associated physical properties. Components have been removed from all but the control formulation to demonstrate changes in resulting physical properties, which are also displayed in Table 3. All amounts shown are in weight percent (wt. %) unless otherwise indicated.

TABLE 3

| Example | I | J | K | L | M | N |
|---|---|---|---|---|---|---|
| Thermoplastic Epoxy | 4.00 | 0.00 | 4.00 | 4.00 | 4.38 | 4.75 |
| Phenoxy | 0.00 | 5.70 | 0.00 | 0.00 | 0.00 | 0.00 |
| High Molecular Weight Solid epoxy resin | 15.00 | 15.00 | 15.00 | 15.00 | 16.41 | 17.82 |
| Low Molecular Weight Solid epoxy resin | 7.00 | 7.00 | 7.00 | 7.00 | 7.66 | 8.31 |
| Polyvinyl butyral | 15.81 | 15.81 | 15.81 | 15.81 | 7.91 | 0.00 |
| Polymeric particle | 21.40 | 21.40 | 21.40 | 21.40 | 23.41 | 25.42 |
| Adducted carboxyl terminated polymer | 3.34 | 3.34 | 0.00 | 3.34 | 3.65 | 3.97 |
| Liquid epoxy resin | 5.00 | 3.30 | 5.00 | 5.00 | 5.47 | 5.94 |
| Flexibilizer | 0.00 | 0.00 | 3.34 | 0.00 | 0.00 | 0.00 |
| Pulp Reinforcement Component | 3.34 | 3.34 | 3.34 | 3.34 | 3.65 | 3.97 |
| Mineral reinforcement component A | 20.52 | 20.52 | 20.52 | 0.00 | 22.45 | 24.37 |
| Mineral reinforcement component B | 0.00 | 0.00 | 0.00 | 20.52 | 0.00 | 0.00 |
| Curing agent | 1.39 | 1.39 | 1.39 | 1.39 | 1.52 | 1.65 |
| Curing agent accelerator | 1.67 | 1.67 | 1.67 | 1.67 | 1.83 | 1.98 |
| Blowing agent | 1.50 | 1.50 | 1.50 | 1.50 | 1.64 | 1.78 |
| Pigment | 0.03 | 0.03 | 0.03 | 0.03 | 0.03 | 0.04 |
| Total | 100.00 | 100.00 | 100.00 | 100.00 | 100.00 | 100.00 |
| Expansion (%) | 297 | 355 | 255 | 243 | 299 | 327 |

TABLE 3-continued

| | | | | | | |
|---|---|---|---|---|---|---|
| Density (g/cc) | 1.31 | 1.31 | 1.3 | 1.3 | 1.3 | 1.33 |
| Volume expansion (3D @ 43° C.)(%) | 244 | 209 | 180 | 158 | 195 | 266 |
| Expansion retention (%) | 82 | 59 | 71 | 65 | 65 | 81 |
| Density (g/cc) | 1.18 | 1.14 | 1.17 | 1.15 | 1.18 | 1.24 |
| Lapshear (psi/Mpa): | | | | | | |
| Initial (61 Mal) | 630 | 573 | 639 | 647 | 591 | 531 |
| 12 Day Humid | 547 | 436 | 541 | 568 | 496 | 419 |
| Lapshear retention (%) | 87 | 76 | 85 | 88 | 84 | 79 |
| T-Peel (N/mm) | 4.15 | 4.12 | 4.18 | 3.47 | 3.78 | 3.3 |
| Tensile: | | | | | | |
| Modulus (MPa) | 942 | 591 | 1074 | 1478 | 927 | 794 |
| Elongation (%) | 2.38 | 1.65 | 3.45 | 2.09 | 1.94 | 1.2 |
| Peak Stress (MPa) | 11.11 | 7.97 | 13.66 | 15.33 | 10.23 | 6.49 |
| Tg (° C.) | 116.41 | 109.26 | 114.9 | 115.33 | 115.47 | 112.28 |
| Room Temp Modulus | 902 | 847 | 965 | 1197 | 911 | 1068 |
| 40° C. (MPa) | 879 | 825 | 917 | 1178 | 887 | 1039 |
| 60° C. (MPa) | 796 | 742 | 758 | 1069 | 806 | 937 |
| 80° C. (MPa) | 479 | 456 | 494 | 667 | 590 | 729 |
| Softening Pt. (° C.) | 85.96 | 89.45 | 95.5 | 88.11 | 91.13 | 90.62 |

| Example | O | P | Q | R | S | T | U |
|---|---|---|---|---|---|---|---|
| Thermoplastic Epoxy | 2.04 | 0.00 | 4.07 | 4.14 | 4.21 | 4.43 | 4.00 |
| Phenoxy | 0.00 | 0.00 | 0.00 | 0.00 | 0.00 | 0.00 | 0.00 |
| High molecular weight solid epoxy resin | 15.31 | 15.63 | 15.26 | 15.52 | 15.81 | 16.62 | 15.00 |
| Low molecular weight solid epoxy resin | 7.14 | 7.29 | 7.12 | 7.24 | 7.38 | 7.75 | 7.00 |
| Polyvinyl butyral | 16.13 | 16.47 | 16.08 | 16.36 | 16.66 | 17.51 | 15.81 |
| Polymeric particle | 21.84 | 22.29 | 21.77 | 22.14 | 10.75 | 0.00 | 21.40 |
| Adducted carboxyl terminated polymer | 3.41 | 3.48 | 1.67 | 0.00 | 3.52 | 3.70 | 3.34 |
| Liquid epoxy resin | 5.10 | 5.21 | 5.09 | 5.17 | 11.70 | 18.46 | 5.00 |
| Flexibilizer | 0.00 | 0.00 | 0.00 | 0.00 | 0.00 | 0.00 | 0.00 |
| Pulp Reinforcement Component | 3.41 | 3.48 | 3.40 | 3.46 | 3.52 | 3.70 | 3.34 |
| Mineral reinforcement component A | 20.94 | 21.38 | 20.87 | 21.23 | 21.62 | 22.73 | 23.58 |
| Mineral reinforcement component B | 0.00 | 0.00 | 0.00 | 0.00 | 0.00 | 0.00 | 0.00 |
| Curing agent | 1.42 | 1.45 | 1.41 | 1.44 | 1.46 | 1.54 | 0.00 |
| Curing agent accelerator | 1.70 | 1.74 | 1.70 | 1.73 | 1.76 | 1.85 | 0.00 |
| Blowing agent | 1.53 | 1.56 | 1.53 | 1.55 | 1.58 | 1.66 | 1.50 |
| Pigment | 0.03 | 0.03 | 0.03 | 0.03 | 0.03 | 0.03 | 0.03 |
| Total | 100.00 | 100.00 | 100.00 | 100.00 | 100.00 | 100.00 | 100.00 |
| Expansion (%) | 332 | 365 | 286 | 242 | 294 | 308 | 225 |
| Density (g/cc) | 1.31 | 1.31 | 1.31 | 1.32 | 1.26 | 1.36 | 1.33 |
| Volume expansion (3D @ 43° C.)(%) | 189 | 206 | 179 | 196 | 242 | 232 | 195 |
| Expansion retention (%) | 57 | 56 | 63 | 81 | 82 | 75 | 87 |
| Density (g/cc) | 1.14 | 1.13 | 1.16 | 1.26 | 1.26 | 1.25 | 1.28 |
| Lapshear (psi/Mpa): | | | | | | | |
| Initial (61 Mal) | 760 | 558 | 695 | 781 | 705 | 578 | 208 |
| 12 Day Humid | 498 | 464 | 400 | 250 | 182 | 183 | 249 |
| Lapshear retention | 66 | 83 | 58 | 32 | 26 | 32 | 120 |
| T-Peel (N/mm) | 4.93 | 4.05 | 4.54 | 3.47 | 3.78 | 3.3 | 4.93 |
| Tensile: | | | | | | | |
| Modulus (MPa) | 976 | 801 | 1160 | 1244 | 1313 | 1397 | 1207 |
| Elongation (%) | 1.96 | 1.62 | 2.86 | 4.23 | 1.80 | 1.15 | 0.37 |

TABLE 3-continued

| | | | | | | | |
|---|---|---|---|---|---|---|---|
| Peak Stress (MPa) | 10.81 | 7.98 | 14.47 | 16.90 | 14.50 | 12.70 | 4.05 |
| Tg (° C.) | 116.98 | 111.35 | 111.78 | 116.96 | 113.72 | 113.01 | 71.51 |
| Room Temp Modulus | 1036 | 883 | 1020 | 1171 | 1135 | 1158 | 960 |
| 40° C. (MPa) | 994 | 850 | 992 | 1144 | 1099 | 1131 | 847 |
| 60° C. (MPa) | 885 | 741 | 893 | 1053 | 982 | 1016 | 101 |
| 80° C. (MPa) | 504 | 404 | 536 | 723 | 580 | 592 | 3.6 |
| Softening Pt. (° C.) | 84.59 | 100 | 93.91 | 108.06 | 89.03 | 87.58 | 49.98 |

After formation of the activatable material, the material is typically applied to a surface or substrate (e.g., a carrier) and activated. Activation of the material may include at least some degree of foaming or bubbling in situations where the activatable material includes a blowing agent. Such foaming or bubbling can assist the activatable material in wetting a substrate and forming an intimate bond with the substrate. Alternatively, however, it shall be recognized that the activatable material may be activated to flow without foaming or bubbling and may still substantially wet the substrate to form an intimate bond. Formation of the intimate bond will typically but not necessarily occur upon curing of the activatable material.

It shall be understood that, depending upon the intended application, the activatable material may be applied and activated in different ways and at different times. Thus, exemplary uses of the activatable material are discussed below to illustrate preferred methodologies of application and activation of the activatable material. In particular, the activatable material may be used for, amongst others, reinforcement, adhering, acoustic baffling or the like.

The activatable material may be used to reinforce structural members of an article of manufacture. When used for reinforcement, the activatable material may be employed by itself, may be employed in conjunction with other materials (e.g., a backing), may be applied to a carrier member or the like.

According to one embodiment, the activatable material of the present teachings is applied to a carrier member to form a reinforcement member and the reinforcement member is inserted within a cavity formed in a structural member of an automotive vehicle. The structural member of the automotive vehicle may be nearly any member of the vehicle including, but not limited to, frame members, body member, pillar structures, closure panels, roof assemblies, bumpers, combinations thereof or the like.

The carrier member may be selected from a variety of conventional and novel configurations. The activatable material of the present teachings may thus be applied to a carrier member, such as a molded, extruded or stamped member (e.g., metal or plastic, foamed or unfoamed; exemplary materials of which include aluminum, magnesium, titanium, steel, molding compound (e.g., sheet or bulk molding compound), polyamide (e.g., nylon 6 or nylon 6,6), polysulfone, thermoplastic imide, polyether imide, polyether sulfone or mixtures thereof.

Examples of carrier members, structural reinforcement applications or the like, which may be employed in the present teachings are disclosed in U.S. Pat. Nos. 6,474,723; 6,467,834; 6,419,305; 6,358,584; 6,311,452; 6,296,298; 6,263,635, all of which are hereby incorporated by reference. Other examples are disclosed in U.S. patent application Ser. Nos. 10/236,315; 10/098,952; 10/337,446; 09/939,152; 09/459,756; 60/409,625; 60/333,273; 60/317,201 all of which are also incorporated herein by reference for all purposes. The carriers may be formed by one or a combination of manufacturing processes including extrusion (including complex co-extrusion), pultrusion, injection molding or blow molding. Accordingly, the activatable materials described herein may be applied to the carriers during manufacture of the carriers, such as by extrusion, during any molding process (including a multi-shot molding process). Alternatively, the activatable may be applied in a secondary process which may include, extrusion (including via a mini-applicator extruder device), molding, die-cutting, pumping or the like.

According to another embodiment, it is contemplated that an activatable material according to the present teachings may be employed as a structural adhesive material. In such an embodiment, the material is typically activated and cured (e.g., at temperatures common to e-coat or automotive painting operations) to adhere to a first member and a second member. Contact with attachment surface of the first member and the second member may occur prior to or during activation and curing of the material. Examples of structural adhesive applications are disclosed in U.S. patent application Ser. Nos. 10/234,902; 10/386,287; 60/451,811, all of which are incorporated herein by reference for all purposes.

As one non-limiting example, the polyvinyl butyral may reduce the tackiness of the material in its green state. The tackiness may be minimized in order to avoid the material in its green state sticking to adjacent parts during any shipping or storage process. Moreover, the activatable material, particularly when provided as a solid, is typically less susceptible to breakage (e.g., chipping or the like) due to PVB.

Certain activatable materials formed in accordance with the present teachings have exhibited post-activation tensile modulus greater than about 500 MPa, more typically greater than about 700 MPa and even possibly greater than about 900 MPa when determined in accordance with ASTM D638 Type IV test method.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A material comprising:
   i) at least about 10% by weight polyvinyl butyral;
   ii) a thermoplastic epoxy, wherein the ratio of polyvinyl butyral to thermoplastic epoxy is 3 to 7 parts polyvinyl butyral to 1 to 2 parts thermoplastic epoxy; and
   iii) a polymeric particle component present in an amount of at least 16% by weight of the material;
   wherein the material has a strain to failure as measured by ISO 527 of greater than 2% but less than 7% and a tensile modulus of at least 900 MPa as measured by ASTM D638 Type IV test method when cured.

2. The material of claim 1, including a curing agent for curing one part epoxy based adhesives at elevated temperatures.

3. The material of claim 2, wherein the material includes a curing agent in the range of about 0.5% to about 5.0% by weight of the material.

4. The material of claim 2, including a blowing agent.

5. The material of claim 4, wherein the material exhibits a volume expansion from a green state to an expanded state of about 100% to about 500%.

6. The material of claim 1, wherein the material contains from about 10% to about 30% by weight of polyvinyl butyral.

7. The material of claim 1, wherein the material has a strain to failure of at least 3%.

8. The material of claim 1, wherein the polymeric particle component is present in an amount of from 16% to 30% by weight of the material.

9. The material of claim 8, wherein the polymeric particle component includes core shell rubber particles averaging about 200 nm in size.

10. The material of claim 8, wherein the polymeric particle component is substantially free of agglomerated particles.

11. The material of claim 1, including an epoxy/elastomer adduct.

12. The material of claim 11, wherein the elastomer in the adduct is selected from styrene butadiene rubber, polysulfide, polybutadiene, acrylics, natural rubber, carboxyl-terminated butadiene-acrylonitrile (CTBN), polysiloxanes, polyester, urethane prepolymers, or any combination thereof.

13. The material of claim 11, including carboxy-terminated butyl nitrile.

14. The material of claim 1, wherein the material includes a blowing agent in the range of about 0.5% to about 5.0% by weight of the material.

15. The material of claim 1, wherein the material when cured exhibits a tensile modulus from about 900 MPa to about 3000 MPa.

16. The material of claim 15, wherein the material when cured exhibits a lap shear strength of at least about 400 psi.

17. The material of claim 1, wherein the material exhibits a T-Peel strength when cured from about 4 N/mm to about 9 N/mm as a result of the combination of polyvinyl butyral, an adducted carboxyl-terminated polymer, and the polymeric particle component.

18. The material of claim 17, including one or more reinforcing components, which may comprise mineral reinforcements.

19. The material of claim 18, wherein the ratio of the adducted carboxyl-terminated polymer to the mineral reinforcement is from about 1 to 4 parts adducted carboxyl-terminated polymer to about 1 to 10 parts mineral reinforcement.

* * * * *